Nov. 16, 1954 E. K. WAGNER 2,694,804
POSITIONING DEVICE
Filed May 22, 1952 3 Sheets-Sheet 3
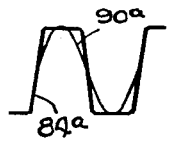
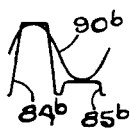
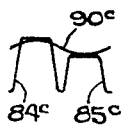
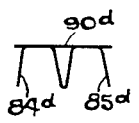
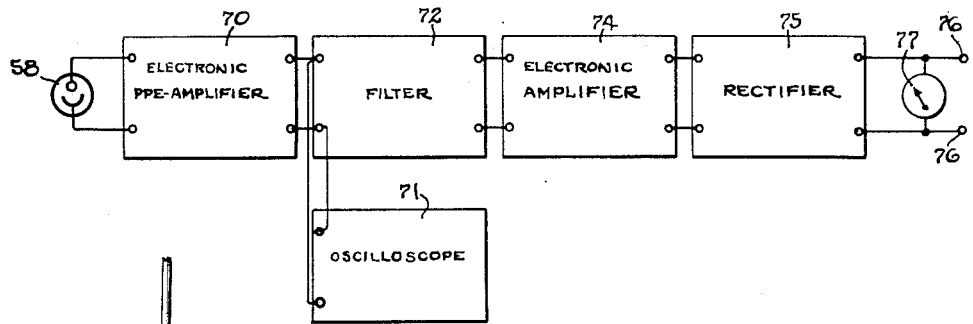
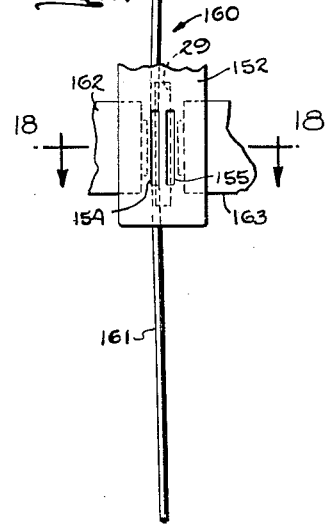
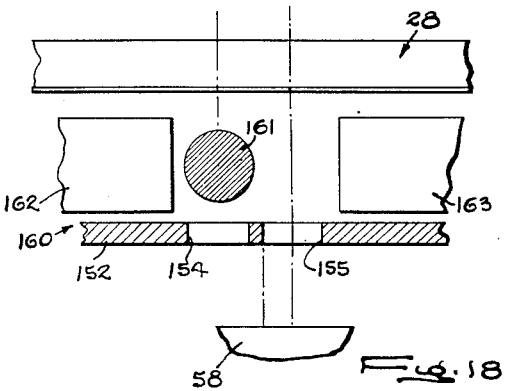
INVENTOR
Elmer K. Wagner
Carlson, Pitzner, Hubbard & Wolfe
ATTORNEY

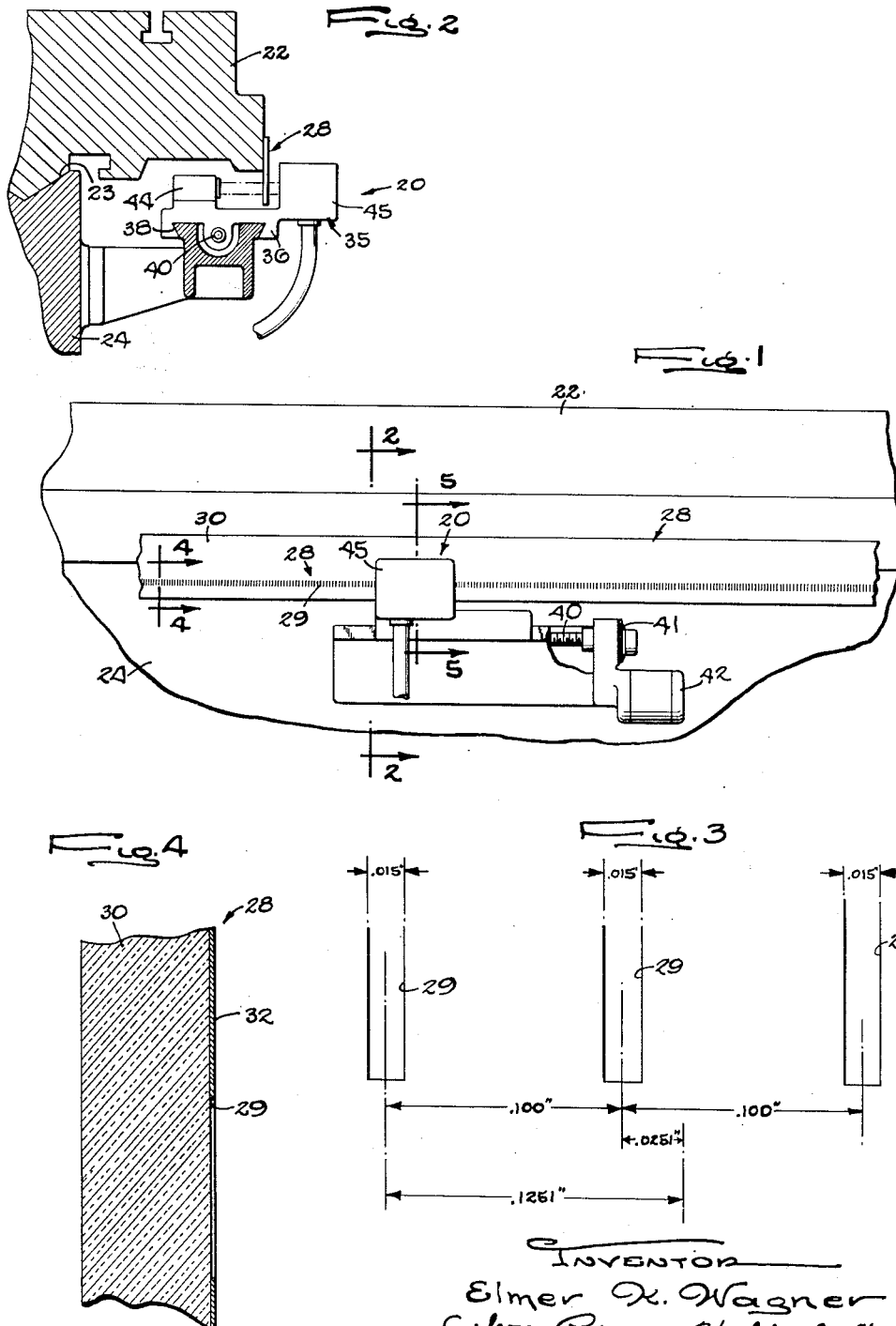

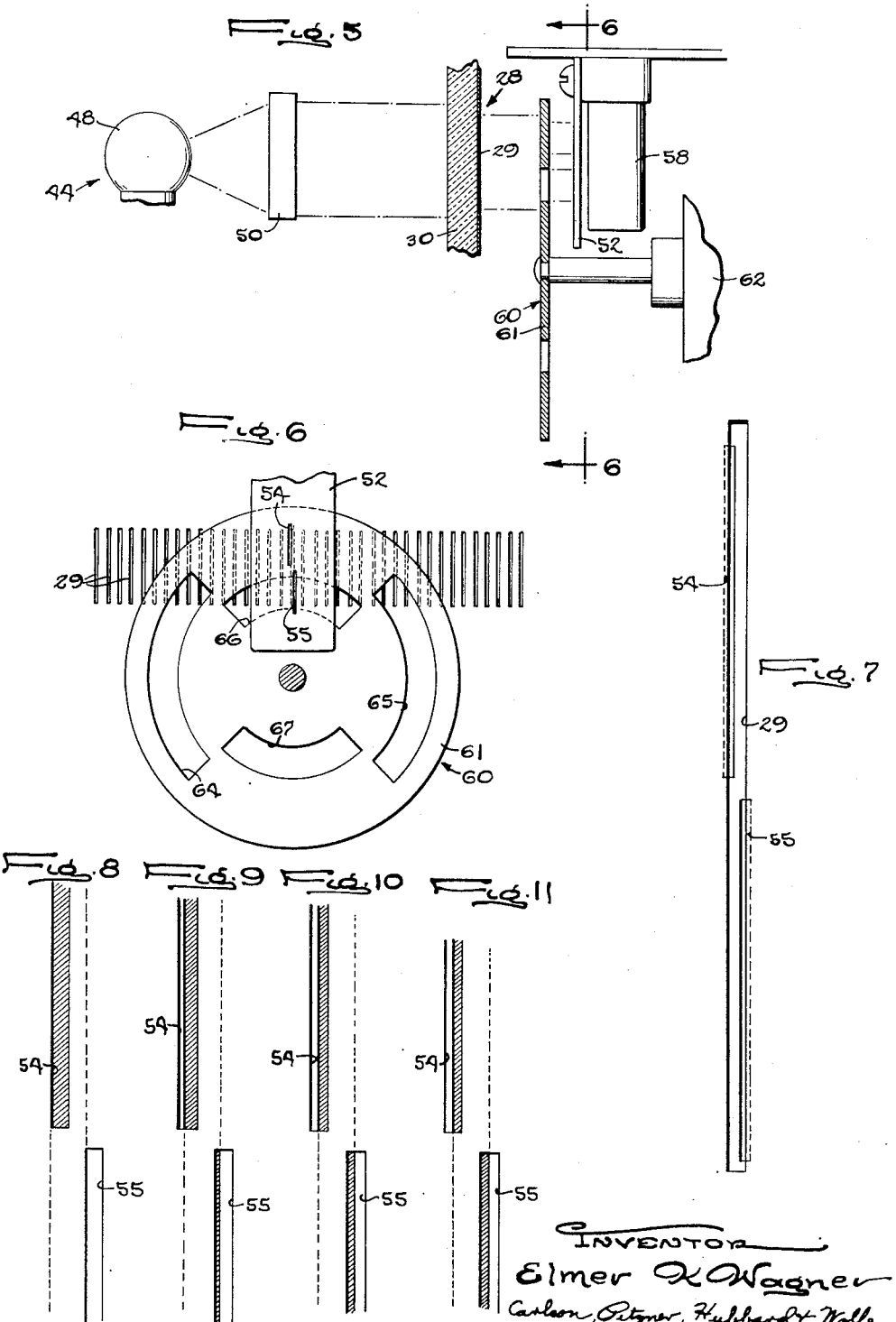

United States Patent Office 2,694,804
Patented Nov. 16, 1954

2,694,804

POSITIONING DEVICE

Elmer K. Wagner, Fond du Lac, Wis., assignor to Giddings & Lewis Machine Tool Company, Fond du Lac, Wis., a corporation of Wisconsin Application May 22, 1952, Serial No. 289,265

16 Claims. (Cl. 340—282)

This invention relates to machine tools, and more particularly to devices for accurately positioning a worktable or any other movable machine tool element.

One of the principal objects of the invention is to provide a photoelectric indicating unit for controlling an automatic positioning device. A more specific object is to provide a photoelectric unit capable of supplying a control signal when a movable machine tool element is moved to a predetermined point. Such a signal may be utilized to stop the movable element in a desired position, for example.

In a more general aspect it is an object of the invention to provide an improved photoelectric device for indicating the relative positions of a pair of relatively movable members.

A further object is to provide a photoelectric device for indicating the position of a member relative to a graduated scale. A particular object is to provide a photoelectric device for indicating whether or not an index member is alined and centered with a particular scale graduation.

A further object is to provide a photoelectric device for centering a pair of closely spaced index elements on a scale graduation or the like.

In general, it is an object of the invention to provide a photoelectric centering device for positioning a movable machine tool element with great accuracy, rapidity and facility.

Further objects and advantages of the invention will appear as the description progresses.

In the accompanying drawings:

Figure 1 is a front elevational view of an exemplary positioning device constructed in accordance with the invention and embodied in an arrangement for positioning the worktable of a machine tool.

Fig. 2 is a transverse elevational section taken generally along the line 2—2 of Fig. 1.

Fig. 3 is a fragmentary greatly enlarged front view of the graduated scale illustrated in Fig. 1.

Fig. 4 is a fragmentary greatly enlarged transverse section of the scale, taken generally along the line 4—4 of Fig. 1.

Fig. 5 is a partially diagrammatic transverse elevational section of the positioning device, taken generally along line 5—5 in Fig. 1.

Fig. 6 is a sectional view taken generally along the line 6—6 of Fig. 5.

Fig. 7 is a fragmentary greatly enlarged front view of the index apertures and one of the scale graduations shown in Fig. 6.

Figs. 8–11 are diagrammatic views, similar to Fig. 7, illustrating successive stages of the operation of centering the index apertures on the scale graduation.

Fig. 12 is a block diagram illustrating the electrical circuit of the positioning device.

Figs. 13–16 are composite oscillograms of electrical signals produced in the positioning device during various stages of the operation thereof.

Fig. 17 is an elevational view showing a modified embodiment of the invention.

Fig. 18 is a sectional plan view of the modified embodiment taken generally along the line 18—18 of Fig. 17.

While the invention is susceptible of various modifications and alternative constructions, there is shown in the drawings and will herein be described in detail the preferred embodiments, but it is to be understood that it is not thereby intended to limit the invention to the forms disclosed but it is intended to cover all modifications and alternative constructions falling within the spirit and scope of the invention as expressed in the appended claims.

Considered generally, the drawings illustrate a device for positioning a pair of relatively movable machine tool elements. In its preferred form, the positioning device includes a scale mounted on one of the elements and an index member mounted on the other element adjacent the scale, the latter being parallel to the direction of movement of the elements. The scale has transparent graduations and the index member is provided with a pair of index slots extending parallel to the graduations and spaced longitudinally of the scale. The spacing and width of the slots are such that both slots may be partially overlapped at the same time by each scale graduation. A light source is provided to train a beam of collimated light on the scale and the index member. The index slots divide the light beam into two parts, which contain equal amounts of light if one of the scale graduations is centered between the slots, but contain unequal amounts if the graduation is slightly off center. The two light beams may be compared by means of a single photoelectric device, together with a shutter for interrupting the two beams alternately. In this way the two beams produce alternate impulses of current in the photoelectric device. A cathode ray oscilloscope may be provided to compare the impulses directly. Moreover, the output signals from the phototube may be utilized to control the movement of the machine tool elements by providing a filter to eliminate all components of the signal except the component having the frequency at which the shutter is operated. This component is present when the graduation is off center, but drops to zero when the graduation is centered.

Considered in greater detail, the drawings illustrate a positioning device 20 (Figs. 1 and 2) for accurately locating a worktable 22, movable linearly along ways 23 formed in a bed 24.

The positioning device 20 includes a reference member in the form of a scale 28 mounted either on the bed, or on and along one edge of the table, preferably the latter as illustrated. Spaced along the scale in the direction of table movement are a plurality of graduations 29 each providing a separate reference point. The graduations may be opaque on a transparent background, but preferably are transparent on an opaque background, as illustrated. In this case the scale comprises a glass backing 30 (Fig. 4) having an opaque graphite coating 32 which is ruled to form the graduations, but the graduations may also be produced photographically. Merely by way of example, the graduations may be 0.15 of an inch wide by ⅝ of an inch long and may be spaced 1/10 of an inch apart.

The positioning device is also provided with a centering or graduation-locating unit 35 (Fig. 2) mounted in this instance on a carriage 36 which is movable parallel to the scale 28 along ways 38 formed on the bed 24. A precision lead screw 40 is provided for moving the carriage, and a graduated micrometer dial 41 (Fig. 1) is mounted on one end of the lead screw to facilitate accurate manual adjustment thereof. An electric motor 42 coupled to the lead screw provides for power operation thereof.

The exemplary centering unit 35 includes a light source 44 (Fig. 2) providing a collimated light beam for illuminating the scale 28, together with an index head 45 positioned adjacent the scale in line with the beam. As best shown in Fig. 5, the light source 44 preferably comprises an electric lamp 48 (Fig. 5) and a collimator 50 which may be a condensing lens, for example. In the index head 45, an index member in the form of a plate 52 is positioned so as to intercept the light beam. While the index plate 52 may be on either side of the scale, it preferably is on the opposite side from the light source, as illustrated. The index plate 52 is provided with a pair of transparent or translucent areas, preferably consisting of slots or rulings 54 and 55 (Fig. 6), parallel to the scale graduations 29 and spaced longitudinally of the scale. In the embodiment shown in Fig. 6, the slots are also offset in a direction parallel to the scale graduations for a reason to be explained shortly. The distance, longitudinally of the scale, between the near edges of the slots is less than the width of the scale graduations, so that a single scale graduation is capable of overlapping both slots. Merely by way of example, the width and the spacing of the slots 54 and 55 may each be about .075 of an inch.

The index slots 54 and 55 provide two light beams which are compared by a light-sensitive device such as a photoelectric tube or cell 58 which in this case is positioned in the index head 45 behind the index plate 52. A shutter 60 is disposed in line with the index plate and the phototube in order to shade or cover the respective slots 54 and 55 alternately. In the embodiment of Figs. 5 and 6, the shutter 60 comprises a rotatable shutter disc 61 driven by an electric motor 62 and provided with apertures or transparent sectors so arranged that the index slots 54 and 55 are uncovered alternately. More specifically, the shutter disc 61 includes two light transmitting sectoral bands 64 and 65 in diametrically opposite quadrants of the disc for uncovering the slot 54, and two other sectoral bands 66 and 67 in the other two quadrants of the disc for uncovering the slot 55. The transparent bands 64 and 65 are offset radially with respect to the bands 66 and 67 so as to correspond to the above-mentioned offsetting of the slots 54 and 55.

It will be apparent to those skilled in the art that the direction of the light beam may be reversed by interchanging the light source 44 and the phototube 58. Moreover, the scale 28, the index member 52, and the shutter 60 may be interposed in the light beam in any desired order.

The phototube 58 is connected to the input of an electronic preamplifier 70 (Fig. 12) such as a cathode follower. An oscilloscope 71 is connected to the output thereof. The output of the preamplifier 70 is also applied to the input of a filter 72, suitably constructed in a conventional manner so as to pass electrical signals at the operating frequency of the shutter 60, while rejecting other signals. An electronic amplifier 74 is connected to the output of the filter 72. The output of the amplifier 74 is connected to a rectifier 75 having a pair of output terminals 76, across which a utilization device is connected, such as a meter 77, for example.

In the operation of the positioning device of Figs. 1–6, any one of the scale graduations 29 may be centered accurately with respect to the index member 52. In general, the centering operation is carried out by moving either the worktable 22 or the carriage 36 until the index slots 54 and 55 are so positioned relative to the scale that they divide the light beam defined by a selected graduation into two equal parts. In other words, the scale and the index member are so positioned that the selected graduation overlaps equal portions of the two slots, as shown in Figs. 7 and 11. Figs. 8–11 illustrate successive stages of the centering operation. In Fig. 8, the selected graduation is considerably off center, so much so that the slot 55 is not overlapped at all, while the slot 54 is completely overlapped by the graduation, as indicated by the shaded area. In the condition shown in Fig. 9, the graduation has been moved closer to center so that it overlaps a small portion of the graduation 55 and a large portion of the graduation 54. In Fig. 10, the areas of overlap are more nearly equal. As previously noted, Fig. 11 shows the centered condition.

The light beams defined by the two slots are compared with the aid of the shutter 60, which operates in such a manner that one photocell serves the purpose of two. When rotated by the motor 62, the shutter 60 shades the slots 54 and 55 alternately, so that light falls on the phototube 58, first from one slot, and then from the other. As a result the phototube produces a signal having alternate impulses of current representing by amplitude the amount of light in the two beams received from the respective slots.

In the various conditions of alinement and misalinement illustrated in Figs. 8–11, the output signals from the phototube 58 have the wave forms shown in the oscillograms of Figs. 13–16, respectively. Oscillograms of this sort may be observed by means of the oscilloscope 71 connected as shown in Fig. 12. The light from the slot 54 produces a large impulse 84a in Fig. 13, but the slot 55, being shaded by the opaque portion of the scale 28, does not produce a corresponding alternate impulse. In Fig. 14 a large impulse 84b and a smaller alternate impulse 85b appear, indicating that the scale graduation is overlapping the slot 54 to a greater extent than the slot 55. Impulses 84c and 85c of more nearly equal amplitude appear in Fig. 15, while in Fig. 16, two equal impulses 84d and 85d are seen, indicating that the graduation is finally centered.

It will be apparent that the oscilloscope 71 may be utilized to indicate alinement between the index member 52 and the successive scale graduations 29, during adjustment of the relative positions of the table 22 and the carriage. Such alinement exists when two impulses of equal amplitude are shown by the oscilloscope, as illustrated in Fig. 16.

The utilization device or meter 77 of Fig. 12 may also indicate or act in response to the centering of the index slots 54 and 55 on the graduations 29. By applying Fourier's analysis, it can be determined that each of the signals represented by the oscillograms of Figs. 13–15 comprises a fundamental frequency component and an infinite series of harmonic frequency components. The fundamental frequency is equal to the operating frequency of the shutter 60. In this case, the operating frequency is twice the rotary speed of the disc 61, inasmuch as there are two sets of light transmitting sectors on the disc.

In amplitude, the fundamental component of the phototube signal is proportional to the difference between the amplitudes of the alternate impulses. This relationship is illustrated by Figs. 13–16, which include a series of sine waves 90a, 90b, 90c and 90d, representing the fundamental component. The sine waves diminish in amplitude as the alternate impulses 84 and 85 approach equality.

The sine waves of Figs. 13–16 represent the output of the filter 72 (Fig. 12), which passes only the fundamental component. After being amplified by the amplifier 74 and rectified by the rectifier 75, the amplitude of the fundamental component may be supplied to any utilization device responsive to the signal output of the rectifier. In the present exemplary form, it is measured by the meter 77, which provides an indication of the difference between the quantities of light emerging from the index slots 54 and 55. When any of the scale graduations 29 is centered over the slots 54 and 55, a zero or minimum reading is obtained on the meter 77 so that the latter serves as an alinement indicator. Absolute zero readings may not always be obtained, because of extraneous signals due to light scattering, noise and vibration, but definite minimum readings are observed in every case.

By operating the micrometer screw 40 in conjunction with the positioning device 20, the worktable 22 may be translated accurately for any desired distance. Fig. 3 illustrates a case in which the table is to be translated .1251 of an inch, which amounts to one whole scale unit of .1 of an inch plus a fractional part consisting of .0251 of an inch. As a first step, the carriage 36 is moved along its ways 38 until the index member 52 is centered on the nearest scale graduation, as indicated by the oscilloscope 71 or the meter 77. This and the subsequent movements of the carriage 36 are effected by rotating the lead screw 40, either manually or by means of the motor 42.

Next, the carriage 36 is offset in the direction of the desired table movement, for a distance equal to the fractional part of the desired distance of table movement, or .0251 of an inch in this case. The micrometer dial 41 is utilized to measure off the desired amount of offsetting. Then the table 22 is set into motion in the desired direction and the graduations 29 of the scale are counted as they pass the index slots 54 and 55 and register on the oscilloscope 71 and the meter 77. The graduation on which the centering unit 35 was centered initially is encountered first and is counted as zero, and successive graduations are counted in order until the desired whole number of scale units is reached, whereupon the table is stopped with the final graduation centered on the index slots 54 and 55, as indicated by the oscilloscope and meter.

In the example illustrated in Fig. 3, the desired direction of table movement is to the right. Consequently, the carriage is offset to the right a distance of .0251 of an inch. Then the table 22 is set into motion and the first graduation is counted as zero. The table is brought to rest with the next and final graduation centered over the index slots 54 and 55. During its movement, the table traverses a distance equal to the amount of the offsetting of the carriage plus one scale unit, or a total distance of .1251 of an inch.

The positioning device may be modified as shown in Figs. 17 and 18 by providing a modified index member 152 and a modified shutter 160 in place of the member 52 and the shutter 60 as shown in Figs. 1–6.

The modified index plate 152 comprises a pair of spaced index graduations or indicia, which preferably are in the form of transparent slots or rulings 154 and 155, arranged side-by-side rather than staggered.

The modified shutter 160 has a vibratory element such as a tensioned wire 161, instead of a rotary disc. When at rest, the wire is centered between the slots 154 and 155. The wire is vibrated by means of a pair of electromagnets 162 and 163, positioned on opposite sides thereof, and in this way the slots 154 and 155 are covered alternately. In other respects, the modified embodiment may be the same as the embodiment of Figs. 1–6.

As in the previously described embodiment, the index slots 154 and 155 of the modified embodiment are centered over a selected scale graduation 29 by comparing the beams of light defined by the slots. For the centered condition the beams contain equal amounts of light, inasmuch as the scale graduation overlaps the slots equally. To compare the two light beams, the wire 161 is set into vibration, this being accomplished by applying suitable pulsating or alternating voltages to the electromagnets 162 and 163. If necessary, the positions of the electromagnets may be adjusted so that the wire covers the slots for equal time intervals. The vibrating wire shades the slots alternately. The alternate light impulses thus produced, are translated into corresponding electrical impulses by the phototube 58. In the modified embodiment the electrical impulses are utilized and analyzed in the manner previously described in connection with Figs. 1–16.

I claim as my invention:

1. In a positioning device, the combination comprising first and second relatively movable units, said first unit including a photoelectric device and a light source for illuminating said device, said second unit including a scale interposed between said source and said photoelectric device oriented parallel to the direction of relative movement of the units, the scale being provided with a plurality of equally spaced light transmitting graduations of predetermined width, an index member on the first unit between said source and said photoelectric device and provided with a pair of light transmitting graduations spaced longitudinally of the scale a distance less than the width of the scale graduations, the index graduations being staggered in a direction transverse to the longitudinal dimension of the scale, a rotary shutter disc on said first unit interposed between the light source and the photoelectric device and provided with a set of radially spaced alternately light transmitting and opaque sectors for alternately shading the index apertures, an oscilloscope coupled to the photoelectric device, a filter coupled to the photoelectric device for rejecting frequencies other than those in the neighborhood of the frequency of operation of the shutter disc, and a utilization device responsive to the output of the filter.

2. In a device for positioning a pair of relatively movable members, the combination comprising a scale adapted to be mounted on one of the members and provided with a plurality of graduations, a light source for illuminating said scale, and photoelectric comparison means adapted to be mounted on the other of said members and provided with a pair of elements of width less than said graduations spaced along the scale less than the width of said graduations for comparing the effect of each of said elements on light transmitted from said scale.

3. In a device for positioning a pair of relatively movable elements, the combination comprising a light source for producing a light beam, a scale in the path of said beam adapted to be mounted on one of the elements and provided with a plurality of graduations, said graduations having different light transmitting characteristics than the remainder of said scale, an index member in the path of said beam adapted to be mounted on the other of the elements and provided with a pair of spaced indicia, said indicia and the remainder of said index member having different light transmitting characteristics corresponding to said graduations and scale, respectively, and means for comparing the transmission effects of said spaced indicia on light affected by one of said scale graduations to thereby determine the position of said indicia relative to said one graduation, the effects being equal when said indicia equally register with said one graduation.

4. In a device for accurately positioning a pair of relatively movable elements, the combination comprising a light source for providing a light beam, an opaque reference member in the path of the light beam adapted to be mounted on one of said elements and provided with a translucent reference graduation, an opaque index member in the light beam and adapted to be mounted on the other of said elements, said index member being provided with a first and a second translucent index graduation spaced in the direction of relative movement of the elements a distance less than the width of said reference graduation, and means for comparing the amounts of light passed through said reference graduation and said first index graduations on the one hand, and through said reference graduation and said second index graduation on the other hand.

5. In a positioning device, the combination comprising first and second relatively movable units, said first unit including a light source for producing a light beam, said second unit including a scale disposed longitudinally along the direction of relative movement and interposed in said beam, said scale being provided with a plurality of graduations, an index member on said first unit interposed in said beam and provided with a pair of indicia spaced in the direction of relative movement a distance less than the width of said graduations, and means on said first unit for comparing the light intercepted jointly by said one of said graduations and the two respective indicia including a photoelectric device positioned to receive such light and a shutter for shading said indicia alternately.

6. In an apparatus for accurately positioning a pair of relatively movable elements, the combination comprising a photoelectric device, a light source for illuminating the device, an opaque scale interposed between the light source and the photoelectric device and adapted to be mounted on one of the movable elements, the scale being provided with a plurality of light transmitting graduations, an opaque index member interposed between the light source and the photoelectric device adjacent the scale and adapted to be mounted on the other of the movable elements, the index member being provided with a pair of light transmitting index markings spaced longitudinally along the scale a distance less than the width of said graduations, a cyclically operable light interrupting shutter for covering the respective index markings alternately, the alternate responses of said photoelectric device being equal when the degrees of registry of each index marking with a graduation are equal, and means to indicate when such alternate responses are equal.

7. In a positioning device, the combination comprising a photoelectric device, a light source for illuminating the same, a relatively opaque scale interposed between the light source and the photoelectric device and provided with a plurality of relatively transparent graduations of a predetermined width, a relatively opaque index member interposed between the light source and the photoelectric device and provided with a pair of relatively transparent graduations spaced apart a distanct less than the width of the scale graduations, and a shutter interposed between the light source and the photoelectric device for covering the index graduations alternately.

8. In an apparatus for accurately positioning a pair of relatively movable elements, the combination comprising a photoelectric device, a light source for illuminating the device, a scale interposed between the light source and the device and adapted to be mounted on one of the elements, the scale being provided with a plurality of spaced graduations, an index member interposed between the light source and the photoelectric device adjacent the scale and adapted to be mounted on the other of the elements, the index member being provided with a pair of index graduations spaced longitudinally of the scale a distance less than the width of said scale graduations, and a light interrupting shutter interposed between the light source and the photoelectric device and provided with a rotary disc having sets of alternate segments for covering the respective index graduations alternately.

9. In an apparatus for accurately positioning a pair of relatively movable elements, the combination comprising a photoelectric device, a light source for illuminating said device, a scale interposed between said source and said device and adapted to be mounted on one of the elements, the scale being provided with a plurality of spaced graduations, an index member interposed between the light source and the photoelectric device adjacent the scale and adapted to be mounted on the other of the elements, the index member being provided with a pair of indicia spaced longitudinally of the scale a distance less than the width of said scale graduations, and a light interrupting shutter interposed between the light source and the photoelectric device and provided with a vibratory element operable to shade the respective indicia alternately.

10. In an apparatus for accurately positioning a pair of relatively movable elements, the combination comprising a photoelectric device, a light source for illuminating said device, a scale interposed between said source and said device and adapted to be mounted on the first element, the scale being provided with a plurality of equally spaced light transmitting graduations, an index member interposed between said source and said photoelectric device adjacent said scale and adapted to be mounted on the other of the movable elements, the index member being provided with a pair of light transmitting graduations spaced longitudinally of the scale a distance less than the width of said scale graduations, shutter means including a vibratory wire interposed between the light source and the photoelectric device for covering the index graduations alternately, and electromagnetic means for vibrating the wire.

11. In an apparatus for accurately positioning a pair of relatively movable elements, the combination comprising a photoelectric device, a light source for illuminating the device, a scale interposed between the photoelectric device and the light source and adapted to be mounted on one of the elements, the scale being provided with a plurality of spaced graduations, an index member positioned between the light source and the photoelectric device adjacent the scale and adapted to be mounted on the other of the elements, the index member being provided with a pair of index graduations spaced longitudinally of the scale a distance less than the width of said scale graduations, a cyclically operable shutter for shading the index graduations alternately, an electrical filter coupled to the output of the photoelectric device for rejecting electrical frequencies other than those in the neighborhood of the frequency of operation of the shutter, and a utilization device responsive to the output of the filter.

12. In a positioning device, the combination comprising a photoelectric device, a light source for illuminating the device, a scale interposed between the photoelectric device and the light source and provided with a plurality of spaced graduations, an index member positioned adjacent the scale between the light source and the photoelectric device and provided with a pair of index graduations spaced longitudinally of the scale a distance less than the width of said scale graduations, a cyclically operable shutter for shading the index graduations alternately, an electrical filter coupled to the photoelectric device for rejecting electrical frequencies other than those in the neighborhood of the cyclical frequency of the shutter, and metering means for measuring the output of the filter.

13. In a positioning device, the combination comprising a photoelectric device, a light source for illuminating the photoelectric device, a scale interposed between the light source and the photoelectric device and provided with a plurality of spaced graduations, an index member positioned adjacent the scale between the light source and the photoelectric device and provided with a pair of index graduations spaced longitudinally of the scale a distance less than the width of said scale graduations, a cyclically operable shutter for shading the index graduations alternately, and an oscilloscope coupled to the output of the photoelectric device for manifesting the wave form of the light impulses received thereby from the respective index graduations, the amplitude of electric signals resulting from such alternate impulses being equal when the index graduations are in equal degrees of registry with one of said scale graduations.

14. In a positioning device, the combination comprising a photoelectric device, a light source for illuminating said device, a scale member interposed between said source and said photoelectric device and provided with a plurality of spaced graduations, an index member interposed between said source and said device having a pair of index graduations spaced apart a distance less than the width of said scale graduations, said scale and index graduations having different light transmitting properties than the remainder of said scale and index members, respectively, means for comparing the amount of light received by said photocell through a scale graduation and one index graduation and through the same scale graduation and the other index graduation, and a movable carriage supporting one of said members for movement with respect to the other, affording adjustment until said compared amounts of light are equal.

15. In a positioning device, the combination comprising a pair of relatively movable units, a photosensitive device carried by one of said units, means for directing a light beam toward said photosensitive device, and opaque scale on one of said units disposed in said light beam and having a light transmitting graduation, an opaque index member on the other other of said units disposed in said light beam and having a pair of light transmitting index portions spaced along the direction of relative movement a distance less than the width of said graduation, the equal degrees of registry of said index portions with said graduation resulting in equal passage of light to said photosensitive device through said two index portions, a shutter for alternately shading said index portions, and a translatable carriage for supporting one of said units for bringing said index portions into equal degrees of registry with said graduation as indicated by equal alternate responses of said photosensitive device.

16. In a positioning device, the combination of an opaque scale having a plurality of light transmitting graduations, an opaque index member having a pair of light transmitting graduations spaced apart a distance less than the width of said scale graduations, means supporting said scale and index member for relative movement, a light source and a photoelectric device supported on opposite sides of said scale and index member to have the source direct light toward the photoelectric device through the scale and index graduations, a shutter for alternately masking said index graduations to provide alternate signals from said photoelectric device representative of the degree of registry of the respective index graduations with a scale graduation, said signals being equal when the degrees of registry are equal and producing a fundamental sinusoidal component substantially of zero amplitude, an electric filter receiving said signals from said photoelectric device and operative to attenuate substantially all sinusoidal components thereof except said fundamental component, and a utilization device receiving the output of said filter, said utilization device receiving a signal which is a function of the unequal degrees of registry of said two index graduations with one of said scale graduations.

References Cited in the file of this patent

UNITED STATES PATENTS

| Number | Name | Date |
|---|---|---|
| 1,794,340 | Parkhurst | Feb. 24, 1931 |
| 2,289,551 | Reason | July 14, 1942 |
| 2,375,665 | Koulicovitch | May 8, 1945 |
| 2,406,299 | Koulicovitch | Aug. 20, 1946 |
| 2,416,968 | Turrettini | Mar. 4, 1947 |
| 2,451,572 | Moore | Oct. 19, 1948 |
| 2,488,269 | Clapp | Nov. 15, 1949 |